United States Patent
Akselrod et al.

(10) Patent No.: US 10,077,984 B2
(45) Date of Patent: Sep. 18, 2018

(54) INDOOR POSITIONING SYSTEM TRAINING

(71) Applicant: International Business Machines Corporation, Armonk, NY (US)

(72) Inventors: Ben Z. Akselrod, Givat Shmuel (IL); Anthony DiLoreto, Markham (CA); Steve McDuff, Markham (CA); Kyle D. Robeson, North York (CA)

(73) Assignee: International Business Machines Corporation, Armonk, NY (US)

( * ) Notice: Subject to any disclaimer, the term of this patent is extended or adjusted under 35 U.S.C. 154(b) by 28 days.

(21) Appl. No.: 14/864,950

(22) Filed: Sep. 25, 2015

(65) Prior Publication Data
US 2017/0090477 A1 Mar. 30, 2017

(51) Int. Cl.
G01C 22/00 (2006.01)
G05D 1/00 (2006.01)
G01C 21/20 (2006.01)
G05D 1/02 (2006.01)

(52) U.S. Cl.
CPC .......... G01C 21/206 (2013.01); G05D 1/028 (2013.01); G05D 1/0221 (2013.01); G05D 1/0274 (2013.01)

(58) Field of Classification Search
USPC .......................................................... 701/25
See application file for complete search history.

(56) References Cited

U.S. PATENT DOCUMENTS

| 8,731,827 | B2 | 5/2014 | Park |
| 8,818,706 | B1 | 8/2014 | Ogale et al. |
| 2009/0043575 | A1* | 2/2009 | Thompson ............... G10L 15/02 704/230 |
| 2009/0262974 | A1* | 10/2009 | Lithopoulos ............. G01C 3/08 382/100 |
| 2010/0134356 | A1 | 6/2010 | Huang et al. |
| 2011/0250904 | A1 | 10/2011 | Valletta et al. |
| 2011/0282622 | A1* | 11/2011 | Canter ............... G06K 9/00691 702/150 |
| 2012/0197439 | A1* | 8/2012 | Wang ..................... B25J 9/1689 700/259 |

(Continued)

FOREIGN PATENT DOCUMENTS

WO 2014203041 A1 12/2014

OTHER PUBLICATIONS

Markus Waibel, Michael Beetz, RoboEarth—A World Wide Web for Robots. In Robotics & Automation Magazine, IEEE, vol. 18, No. 2, pp. 69-82, Jun. 2011 (hereinafter "Weibel").*

(Continued)

*Primary Examiner* — Jean Paul Cass
(74) *Attorney, Agent, or Firm* — Christopher K. McLane; Daniel R. Simek

(57) ABSTRACT

In an approach for collecting data, a computer identifies a virtual map of an environment. The computer determines a location associated with one or more autonomous devices within the identified virtual map. The computer provides to a first autonomous device of the one or more autonomous devices, navigation instructions from a determined location associated with the first autonomous device to a first training point. The computer collects training data associated with the first training point through the first autonomous device.

16 Claims, 3 Drawing Sheets

(56) References Cited

U.S. PATENT DOCUMENTS

| | | | | |
|---|---|---|---|---|
| 2012/0242501 A1* | 9/2012 | Tran | ............... | A61B 5/0024 340/870.02 |
| 2012/0316774 A1* | 12/2012 | Yariv | ............... | G01C 21/26 701/423 |
| 2013/0054133 A1* | 2/2013 | Lewis | ............... | G01C 21/3407 701/423 |
| 2013/0157786 A1* | 6/2013 | Joseph | ............... | A63B 69/40 473/436 |
| 2013/0215115 A1* | 8/2013 | Jenkins | ............... | G06T 15/20 345/420 |
| 2013/0244688 A1 | 9/2013 | Huang et al. | | |
| 2014/0141796 A1* | 5/2014 | Marti | ............... | G01S 5/0252 455/456.1 |
| 2014/0278229 A1* | 9/2014 | Hong | ............... | A63B 71/06 702/160 |
| 2015/0016777 A1* | 1/2015 | Abovitz | ............... | G02B 27/225 385/37 |
| 2015/0234477 A1* | 8/2015 | Abovitz | ............... | G06K 9/00671 382/103 |
| 2015/0269770 A1* | 9/2015 | Jenkins | ............... | G06T 15/40 345/421 |
| 2015/0308839 A1* | 10/2015 | Jiang | ............... | G01C 21/32 702/5 |
| 2015/0309264 A1* | 10/2015 | Abovitz | ............... | G02B 6/34 385/33 |
| 2016/0026253 A1* | 1/2016 | Bradski | ............... | G02B 27/225 345/8 |
| 2016/0127931 A1* | 5/2016 | Baxley | ............... | G01S 5/0263 455/67.16 |
| 2016/0221186 A1* | 8/2016 | Perrone | ............... | B25J 9/1661 |
| 2016/0223350 A1* | 8/2016 | Lewis | ............... | G01C 21/3407 |
| 2017/0131200 A1* | 5/2017 | Raveh | ............... | G01N 21/23 |

OTHER PUBLICATIONS

Google patents to Liu from https://www.google.ch/patents/US9493236.*
US 9,493,236, 07/2015, Lui (withdrawn)*
Bolliger, Philipp, "Redpin—Adaptive, Zero-Configuration Indoor Localization through User Collaboration", MELT '08, Sep. 19, 2008, Copyright 2008 ACM, 6 pages.
Rai, et al., "Zee: Zero-Effort Crowdsourcing for Indoor Localization", MobiCom '12, Aug. 22-26, 2012, Copyright 2012 ACM, 12 pages.
Silbert, Sarah, "MITs real-time indoor mapping system uses Kinect, lasers to aid rescue workers", Sep. 25, 2012, 4 pages, <http://www.engadget.com/2012/09/25/mit-realtime-indoor-mapping-kinect/>.

* cited by examiner

INDOOR POSITIONING SYSTEM TRAINING

BACKGROUND

The present invention relates generally to the field of indoor positioning systems, and more particularly to collecting training data for calibration of the indoor positioning system.

Indoor positioning systems (IPS) are solutions to locate objects and/or people within a building (e.g., store, venue, public service building, etc.) or designated area through sensory information collected by a mobile device. Instead of utilizing satellites, IPS solutions rely on different technologies, including distance measurement to nearby anchor nodes (e.g., nodes with known positions, such as wireless access points), magnetic positioning, and dead reckoning. The IPS either actively locates mobile devices and tags or provides ambient location or environmental content for devices to be sensed. Magnetic positioning utilizes a mobile device to measure magnetic disturbances in the Earth's magnetic field. The magnetic disturbances, when mapped, provide a digital representation of a building's floor plan. Dead reckoning is the process of calculating the current position of an individual by using a previously determined position, or a position derived from measuring external reference points, and advancing that position based upon known or estimated speeds over an elapsed time and course.

Wireless indoor positioning systems apply a localization technique used for positioning that is based on measuring the intensity of a received signal strength indicator (RSSI) associated with a wireless access point. The wireless access points (WAPs) are special-purpose communication devices on wireless local area networks (WLANs), consisting of radio transceivers, antennas and device firmware that act as a central transmitter and receiver of wireless radio signals. Additionally, the wireless access points include unique identifiers such as a service set identification (SSID) and a media access control address (MAC address) that aid in geo-location. The wireless indoor positioning system accesses a database that correlates mobile device GPS location data with the MAC addresses of the access points thus providing a geo-location of the associated wireless access point. The received signal strength indicator (RSSI) is a measurement of power present in a received radio signal. Signal strength refers to the magnitude of an electrical field (e.g., signal) at a reference point that is a distance from the transmitting antenna. Calibration of devices (e.g., indoor positioning systems) occur based on a comparison between RSSI measurements, one of a known magnitude (e.g., made or set), and another RSSI measurement associated with a received radio signal.

SUMMARY

Aspects of the present invention disclose a method, computer program product, and system for collecting data. The method includes one or more computer processors identifying a virtual map of an environment. The method further includes one or more computer processors determining a location associated with one or more autonomous devices within the identified virtual map. The method further includes one or more computer processors providing to a first autonomous device of the one or more autonomous devices, navigation instructions from a determined location associated with the first autonomous device to a first training point. The method further includes one or more computer processors collecting training data associated with the first training point through the first autonomous device.

DETAILED DESCRIPTION

Embodiments of the present invention recognize that wireless indoor positioning system can be used when global positioning systems (GPS) are inadequate (e.g., unable to determine locations due to limitations) and require calibration. Calibration of devices (e.g., indoor positioning systems) occur based on a comparison between RSSI(s), one of a known magnitude (e.g., made or set), and another RSSI associated with a received radio signal. As recognized by embodiments of the present invention, the calibration of wireless indoor positioning systems, when performed manually, is time consuming and error prone. Embodiments of the present invention determine a location of an autonomous device with respect to a training point associated with wireless access points and enable RSSI device to train the wireless indoor positioning and provide information for calibration. Embodiments of the present invention work in tandem with multiple autonomous devices to share the workload associated with the training, thus allowing an area to be mapped quickly and efficiently.

Figure 1:
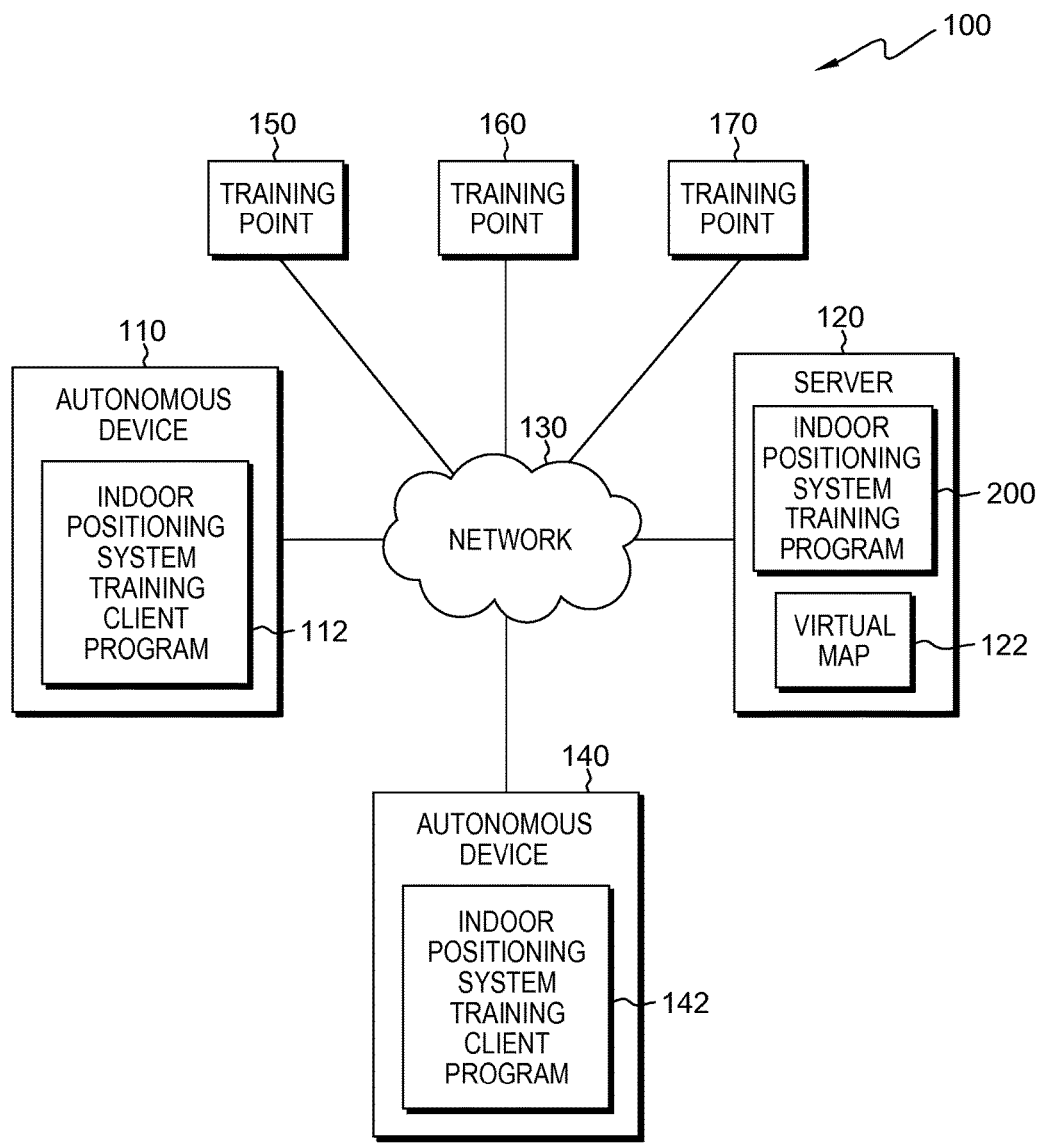
FIG. 1 is a functional block diagram illustrating an indoor positioning system environment, in accordance with an embodiment of the present invention.

The present invention will now be described in detail with reference to the Figures. FIG. 1 is a functional block diagram illustrating an indoor positioning system environment, generally designated 100, in accordance with one embodiment of the present invention. FIG. 1 provides only an illustration of one embodiment and does not imply any limitations with regard to the environments in which different embodiments may be implemented.

In the depicted embodiment, indoor positioning system environment 100 includes autonomous device 110, autonomous device 140, training points 150, 160, and 170, and server 120, all interconnected over network 130. Indoor positioning system environment 100 may include additional computing devices, mobile computing devices, servers, computers, storage devices, autonomous devices, training points, or other devices not shown.

Autonomous devices 110 and 140 are un-crewed vehicles (e.g., user is not present onboard), such as unmanned aerial vehicle (UAV), unmanned ground vehicle (UGV), robot, drone, etc., which are capable of movement through flight and/or ground travel. The number of autonomous devices are not limited to autonomous devices 110 and 140; additional autonomous devices may exist or be added that are not currently shown in FIG. 1. In the depicted embodiment, autonomous devices 110 and 140 sense the environment and navigate through flight and/or ground travel to a location through software-controlled flight plans or navigation routes without user input to training points 150, 160, or 170 for training associated with an indoor positioning system. In another embodiment, autonomous devices 110 and 140 may be controlled remotely by a user to reach a set location with respect to training points 150, 160, or 170 for training associated with an indoor positioning system.

Autonomous devices 110 and 140 acquire training data regarding an access point at associated with training points 150, 160, and 170, and sends training information to indoor positioning system training program 200 through indoor positioning system training client programs 112 and 142 respectively. Autonomous devices 110 and 140 communicate respective locations and training status information pertaining to training points 150, 160, and 170 over network 130 to additional autonomous devices (e.g., includes sending information between autonomous devices 110 and 140) and indoor positioning system training program 200 in order to avoid collisions and revisiting training points. Autonomous devices 110 and 140 send and receive information (e.g., location, training status, untrained training point information, updated flight plans, navigation routes, etc.) to and from indoor positioning system training program 200. Autonomous devices 110 and 140 contain indoor positioning system training client programs 112 and 142 respectively.

Indoor positioning system training client programs 112 and 142 operate to access indoor positioning system training program 200. Indoor positioning system training client programs 112 and/or 142 receive information regarding the location and status of training points 150, 160, and 170 within indoor positioning system environment 100 from indoor positioning system training program 200 and/or autonomous devices 110 and 140. Indoor positioning system training client programs 112 and/or 142 acquire training data pertaining to training points 150, 160, and 170, and send the training data to indoor positioning system training program 200 for further processing. Indoor positioning system training client programs 112 and 142 reside on autonomous devices 110 and 140 respectively.

Server 120 may be a management server, a web server, or any other electronic device or computing system capable of receiving and sending data. In some embodiments, server 120 may be a laptop computer, a tablet computer, a netbook computer, a personal computer (PC), a desktop computer, a personal digital assistant (PDA), a smart phone, or any programmable device capable of communication with autonomous devices 110 and 140 over network 130. In other embodiments, server 120 may represent a server computing system utilizing multiple computers as a server system, such as in a cloud computing environment. Server 120 contains virtual map 122 and indoor positioning system training program 200.

Virtual map 122 is an electronic depiction of the configuration of an area covered by an indoor positioning system (e.g., vector diagram, grid system, etc.). For example, virtual map 122 is a vector diagram that identifies store features (e.g., placement of walls, pillars, stairs, etc.) and provides exact measurements as to the size and location of the store features. A vector diagram is a representation of a relationship measured in both magnitude and direction (e.g., 5 feet to the northwest, 10 feet at a 30 degree angle, etc.). Additionally, virtual map 122 includes the x and y coordinates (e.g., grid system) associated with training points 150, 160, and 170. A grid system describes the location of a point on virtual map 122 in X-Y space, in which the grid includes an origin and a uniform spacing between each point. In the depicted embodiment, virtual map 122 resides on server 120. In another embodiment, virtual map 122 resides on autonomous devices 110 and 140. In some other embodiment, virtual map 122 resides on other computing devices, autonomous devices, and servers (not shown), in accordance with embodiments of the inventions provided virtual map 122 is accessible by indoor positioning system training client programs 112 and 142, and indoor positioning system training program 200.

Network 130 may be a local area network (LAN), a wide area network (WAN) such as the Internet, a wireless local area network (WLAN), such as WiFi, a wireless personal area network (WPAN) such as Bluetooth®, any combination thereof, or any combination of connections and protocols that will support communications between autonomous devices 110 and 140, server 120, other computing devices, autonomous devices, and servers (not shown), in accordance with embodiments of the inventions. Network 130 may include wired, wireless, or fiber optic connections.

Training points 150, 160, and 170 are locations associated with wireless access points (WAPs) and or beacons that operate on network 130 (e.g., wireless local area networks). A wireless access point is a device that allows wireless devices to connect to a wire network using local wireless computer networking technology, or related standards within an indoor positioning system. A beacon is a WPAN low energy device that broadcasts associated identifiers to nearby portable electronic devices, such as autonomous device 110 that are part of an indoor positioning system. Within an indoor positioning system, training points 150, 160, and 170 represent known positions. Training points 150, 160, and 170, are utilized to acquire training data associated with the access points included within an indoor positioning system. The number of training points are not limited to training points 150, 160 and 170; additional training points may exist or be added that are not currently shown in FIG. 1. Autonomous devices 110 and/or 140 navigate to training points 150, 160, and 170, transmit a radio signal, receive an RSSI level and transmit the training data to indoor positioning system training program 200 in order for the indoor positioning system to ultimately calibrate access points.

Indoor positioning system training program 200 is a program for acquiring training data that aids in the calibration of an indoor positioning system. Indoor positioning system training program 200 sends virtual map 122 to autonomous devices 110 and 140 with a starting location (e.g., the location of training points 150, 160, or 170) to begin training. Indoor positioning system training program 200 receives training data associated with training points 150, 160, and 170 from autonomous devices 110 and 140 through indoor positioning system training client programs 112 and 142 respectively. In the depicted embodiment, indoor positioning system training program 200 resides on server 120. In another embodiment, indoor positioning system training program 200 resides on other computing devices, autonomous devices, and servers (not shown), in accordance with embodiments of the inventions provided indoor positioning system training program 200 has access to virtual map 122, and autonomous devices 110 and 140.

Figure 2:
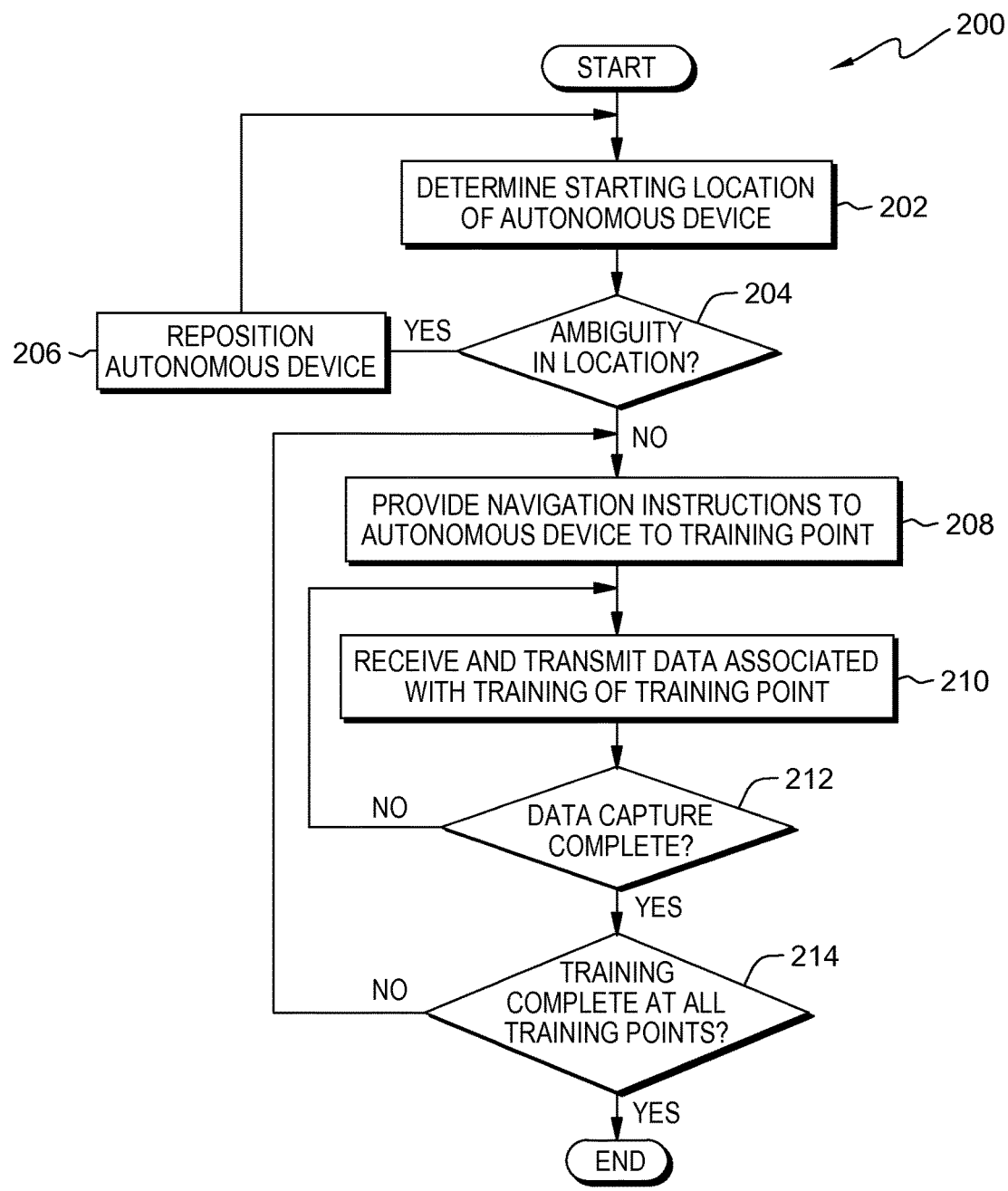
FIG. 2 is a flowchart depicting operational steps of an indoor positioning system training program, on a server computer within the indoor positioning system environment of FIG. 1, for utilizing autonomous devices to train an indoor positioning system, in accordance with an embodiment of the present invention.

FIG. 2 is a flowchart depicting operational steps of indoor positioning system training program 200, a program for utilizing autonomous devices 110 and 140 to train an indoor positioning system, in accordance with an embodiment of the present invention. In one embodiment, indoor positioning system training program 200 initiates based on a predefined schedule (e.g., maintenance, scheduled interval, initial installation, error detection, etc.) and sets the status of training points 150, 160, and 170 to incomplete. In another embodiment, indoor positioning system training program 200 initiates in response to a user action that begins training of an indoor positioning system and sets the status of training points 150, 160, and 170 to incomplete. At initiation, indoor positioning system training program 200 uploads virtual map 122 (includes locations of training points 150, 160, and 170) to autonomous devices 110 and/or 140 through indoor positioning system training client programs 112 and 142 respectively. Additionally, indoor positioning system training program 200 uploads information regarding the location and operational status (e.g., on, off, training, etc.) of autonomous device 110 and/or 140 that are to perform training. For example, indoor positioning system training program 200 notifies autonomous device 110 of the location and operational status of autonomous device 140 and the reciprocal, in order to avoid collisions and collecting the same training data more than once.

In step 202, indoor positioning system training program 200 determines a starting location associated with autonomous device 110 and/or 140. In one embodiment, a user, through indoor positioning system training program 200, identifies a starting point associated with autonomous device 110 and/or autonomous device 140 within virtual map 122. For example, a user identifies the storage location where autonomous device 110 and/or 140 reside when not in use, within virtual map 122 as the starting location. The storage location is associated with a set of x and y coordinates, that indoor positioning system training program 200 identifies as the starting location to autonomous device 110 and/or autonomous device 140 for future utilization with respect to navigation. In another embodiment, indoor positioning system training program 200 initiates range finder technology within indoor positioning system training client programs 112 and/or 142 and determines the starting location of autonomous devices 110 and 140, respectively, within virtual map 122.

For example, indoor positioning system training program 200 initiates indoor positioning system training client program 112 to perform a 360 degree scan of the environment by autonomous device 110. In response, autonomous device 110 transmits a signal (e.g., scan) that results in reflections of the signal from obstacles (e.g., walls, pillars, shelves, etc.). Indoor positioning system training program 200 receives scan data (e.g., reflections of the signal from obstacles and/or objects) associated with multiple points (e.g., predefined or user configurable) within the 360 degree scan from autonomous device 110. Indoor positioning system training program 200 calculates the distances and direction (e.g., angle in degrees, north, east, south, west, etc.) within the 360 degree scan from the obstacles based on received scan data for each of the multiple points. Indoor positioning system training program 200 compares the calculated distances and direction from autonomous device 110 to the obstacles relative to the known distances and direction to obstacles embedded within virtual map 122 and determines a location associated with autonomous device 110 (e.g., x and y coordinates).

In another embodiment, when the location of autonomous device 110 is not definitive (e.g., identifies multiple possible locations of autonomous device 110), indoor positioning system training program 200 initiates an additional 360 degree scan of the environment (e.g., repositions autonomous device 110 and/or 140 and initiates a new scan). Indoor positioning system training program 200 calculates new distances and directions to obstacles with respect to the additional 360 degree scan after relocation. In one embodiment, indoor positioning system training program 200 compares the new distances and directions with respect to the known distances and directions in virtual map 122 and determines a location. In another embodiment, indoor positioning system training program 200 compares the new distances and directions with a subset of locations and associated distances and directions from the previous scan (e.g., compares the multiple locations identified within the initial scan with the new scan results) and determines a location within the subset. Indoor positioning system training program 200 continues to perform additional iterations of the range finder technology until indoor positioning system training program 200 identifies a single location associated with autonomous devices 110 and/or 140 and assigns the corresponding set of x and y coordinates.

In decision 204, indoor positioning system training program 200 determines whether the scan data results for autonomous device 110 and/or autonomous device 140 includes an ambiguity in the location. Indoor positioning system training program 200 determines an ambiguity when indoor positioning system training program 200 identifies more than one potential location of autonomous device 110 and/or 140 within virtual map 122. For example, indoor positioning system training program 200 determines autonomous device 110 may be in one of two possible locations within a store based on the results of the scan data (from step 202). An ambiguity may occur due to issues encountered as a result of multipath and/or path loss. Multipath is a propagation phenomenon that results in signals that reach the receiving antenna of autonomous device 110 and/or 140 simultaneously, by two or more paths. Multipath is a result of refraction and/or reflection of the signal from objects (e.g., pillars, shelving, etc.) that results in a ghosting of the signal (e.g., echoes of the original signal from different locations that are not distinguishable). Path loss or path attenuation is the reduction in power density of the signal as the signal propagates though space thus changing the calculated distance associated with a scan. Path loss may occur in response to many factors, such as free-space loss, refraction, diffraction, reflection, absorption, environment (urban or rural, wood or metal), propagation medium (e.g., dry or moist air), and the height and location of antennas.

If indoor positioning system training program 200 determines that the scan results for autonomous device 110 and/or autonomous device 140 includes an ambiguity in the location (decision 204, yes branch), then indoor positioning system training program 200 repositions autonomous device 110 and/or 140 (step 206). If indoor positioning system training program 200 determines that the scan results for autonomous device 110 and/or autonomous device 140 does not include an ambiguity in the location (decision 204, no branch), then indoor positioning system training program 200 navigates autonomous device 110 and/or 140 to training points 150, 160, or 170 (step 208).

In step 206, indoor positioning system training program 200 repositions autonomous device 110 and/or 140. In one embodiment, indoor positioning system training program 200 moves autonomous devices 110 and/or 140 by altering the vertical component (e.g., height, y coordinate component) of the location of autonomous device 110 and/or 140 (e.g., raises or lowers to avoid obstacles). In another embodiment, indoor positioning system training program 200 moves autonomous devices 110 and/or 140 a predefined lateral distance from the current location (e.g., left, right, forward, back, x component, etc.). In some other embodiment, indoor positioning system training program 200 repositions autonomous devices 110 and/or 140 both vertically and laterally to avoid obstacles that may impact a subsequent range finder scan.

In step 208, indoor positioning system training program 200 provides navigation instructions to autonomous device 110 and/or 140 to a training point (e.g., training point 150, 160, or 170). In one embodiment, indoor positioning system training program 200 identifies an initial training point within virtual map 122, such as training point 150 to autonomous device 110 and training point 160 to autonomous device 140, to begin training of an indoor positioning system. Indoor positioning system training program 200 can assign a different training point to autonomous device 110 and autonomous device 140 for training in order to maximize efficiency. In another embodiment, indoor positioning system training program 200 identifies the nearest training point (e.g., training point 150, 160, or 170) to autonomous devices 110 and/or 140 based on the determined location of autonomous devices 110 and/or 140 (from step 202). Indoor positioning system training program 200 assigns the closest autonomous device 110 or 140 to the corresponding training point. For example, autonomous device 110 is 15 feet away from training point 150, and 100 feet away from training point 160. Autonomous device 140 is 75 feet away from training point 150, and 20 feet away from training point 160. Therefore, indoor positioning system training program 200 assigns training point 150 to autonomous device 110 and training point 160 to autonomous device 140.

In one embodiment, indoor positioning system training program 200 initiates flight software (e.g., automatic pilot) on autonomous device 110 and/or autonomous device 140 and determines a flight path to training point 150, 160, or 170. In another embodiment, indoor positioning system training program 200 initiates ground navigation software on autonomous device 110 and/or autonomous device 140 and provides navigation instructions to training point 150, 160, or 170. For example, based on the determined location of autonomous device 110 (e.g., starting point) and the known location of training point 150 (e.g., destination), indoor positioning system training program 200 utilizes route planning software to create navigation instructions. Indoor positioning system training program 200 provides the navigation instructions to autonomous device 110 for further use. After providing a flight path or navigation route, indoor positioning system training program 200 initiates an autopilot function to navigate autonomous device 110 and/or 140 to training point 150, 160, or 170. In some other embodiment, a user navigates autonomous device 110 and/or autonomous device 140 to training points 150, 160, or 170 remotely through indoor positioning system training program 200. In one embodiment, indoor positioning system training program 200 determines autonomous device 110 and/or 140 reaches training point 150, 160, and/or 170, and indoor positioning system training program 200 sends a predefined specified hover height to indoor positioning system training client program 112 and/or 142, which then alters the height of autonomous device 110 and/or 140 to the specified height. In another embodiment, once indoor positioning system training program 200 determines autonomous device 110 and/or 140 reaches training point 150, 160, and/or 170, indoor positioning system training program 200 instructs indoor positioning system training client program 112 and/or 142 to raise a retractable antenna associated with autonomous device 110 and/or 140.

For example, virtual map 122 includes the x and y coordinates of training points 150. Indoor positioning system training program 200 determines a flight plan (e.g., navigation route) based on the x and y coordinates associated with training point 150, the x and y coordinates associated with autonomous device 110, and virtual map 122. In one embodiment, indoor positioning system training program 200, through indoor positioning system training client program 112 and feedback from onboard sensors associated with autonomous device 110, flies autonomous device 110 (e.g., first autonomous device) along the flight path until reaching the x and y coordinates (e.g., destination) associated with training point 150. In another embodiment, indoor positioning system training program 200 provides navigation instructions to indoor positioning system training client program 112. Autonomous device 110 utilizes the provided navigations instructions with onboard sensors and flight control and/or driving software to reach the destination (e.g., training point 150). Indoor positioning system training program 200 determines autonomous device 110 reaches training point 150 when the x and y coordinates match. Once indoor positioning system training program 200 determines autonomous device 110 is in position, indoor positioning system training program 200 sets the hovering height for autonomous device 110, and initiates a change in height.

In another embodiment, indoor positioning system training program 200 identifies a second untrained training point within virtual map 122, such as training point 170, to autonomous device 110 or autonomous device 140 (e.g., completes training at the current training point). For example, indoor positioning system training program 200 determines training is complete at training point 150 (e.g., first training point). Additionally, indoor positioning system training program 200 determines autonomous device 140 is located at training point 160 and training is already in-process. However, indoor positioning system training program 200 determines training at training point 170 has not occurred and is not currently in-process. Therefore, indoor positioning system training program 200 determines a flight plan from training point 150 (e.g., first training point) to training point 170 (e.g., second training point). Indoor positioning system training program 200 navigates autonomous device 110 to training point 170.

In an alternate embodiment, indoor positioning system training client program 112 and/or indoor positioning system training client program 142 identify additional untrained instances of training point 150, 160, and 170 directly. For example, autonomous device 110 is located at training point 150 and training is in-process, while autonomous device 140 is located at training point 160 and training is in-process. Indoor positioning system training client programs 112 and/or 142 share location and training data and determine that the training of training point 170 is incomplete (e.g., untrained, data collection has not taken place, etc.). In one embodiment, based on the status of the training occurring at training point 150 and 160, indoor positioning system training client program 112 and 142 can determine which of autonomous device 110 or autonomous device 140 is available to begin training at an untrained training point. For example, training at training point 150 is complete, and training at training point 160 is in-process, therefore autonomous device 110 is available to begin training at training point 170.

In another embodiment, based on the distance to training point 170 from training point 150 and 160, indoor positioning system training client program 112 and 142 determine which of autonomous devices 110 and 140 is closer to training point 170. For example, both autonomous device 110 and 140 are available; however, autonomous device 140 is twenty feet away from training point 170 whereas autonomous device 110 is fifty feet away from training point 170. Indoor positioning system training client program 112 and 142 determine autonomous device 140 is closer, and assign the training of training point 170 to autonomous device 140. In some other embodiment, based on the training status and the distance, indoor positioning system training client programs 112 and/or 142 determine and assign autonomous device 110 or autonomous device 140 to perform the training of training point 170. Upon assignment of training point 170 to autonomous device 110 or 140, indoor positioning system training client programs 112 and/or 142 determines and initiates a navigation route to training point 170.

In step 210, indoor positioning system training program 200 receives and transmits data associated with the training of training points 150, 160, and/or 170. Indoor positioning system training program 200 receives an indication from indoor positioning system training client programs 112 and/or 142 that autonomous device 110 and/or 140 is in position to begin training of training point 150, 160, and/or 170. Indoor positioning system training program 200 updates the training status of training point 150, 160, and/or 170 to in-process once indoor positioning system training program 200 receives and transmits training data associated with training point 150, 160, and/or 170. Indoor positioning system training program 200 receives a ready indication from the indoor positioning system (e.g., ready to receive data). Indoor positioning system training program 200 initiates the transmission of a set uniform RSSI strength level (e.g., no variations in power level due to charge level or positional changes) from autonomous device 110 and/or 140 to training point 150, 160, and/or 170. For example, indoor positioning system training program 200 initiates the transmission of an RSSI level associated with a mobile phone. Indoor positioning system training program 200 initiates data collection (e.g., system tracking) of training point 150, 160, and/or 170 through autonomous device 110 and/or 140. For example, autonomous device 110 receives information associated with training point 150 in response to the RSSI signal initiated by autonomous device 110.

In one embodiment, indoor positioning system training program 200 creates a file based on the received MAC address of an access point associated with training point 150, 160, and/or 170 to store collected data. In another embodiment, indoor positioning system training program 200 prepares to send streaming data from indoor positioning system training client programs 112 and/or 142 associated with training point 150, 160, and/or 170 encoded with the associated received MAC address for identification. Indoor positioning system training program 200 receives the collected data via transmissions from indoor positioning system training client programs 112 and/or 142. Indoor positioning system training program 200 transmits the collected data (e.g., file or streaming data) to the indoor positioning system for further analysis and calibration of the access points. Indoor positioning system training program 200 continues to collect and transmit data associated with training point 150, 160, and/or 170 until indoor positioning system training program 200 determines data capture is complete (decision 212, yes branch).

In decision 212, indoor positioning system training program 200 determines whether the data capture is complete. In one embodiment, indoor positioning system training program 200 receives an indication (e.g., training complete, continue training, restart training, etc.) from the indoor positioning system after an analysis of the data. In another embodiment, indoor positioning system training program 200 collects data for a specified amount of time (e.g., minutes). In some other embodiment, indoor positioning system training program 200 collects a specified number of data points (e.g., 50, 100, etc.). In some other embodiment, indoor positioning system training program 200 performs preliminary calculations on the data collected and determines the data collected is within a threshold and/or exceeds a defined data threshold (e.g., maximum and/or minimum variation between the RSSI levels, receives a specific number of data points at an RSSI level, etc.). Indoor positioning system training program 200 updates the training status of training point 150, 160, and/or 170 to complete once indoor positioning system training program 200 determines the data capture is complete at training point 150, 160, and/or 170.

If indoor positioning system training program 200 determines the data capture is complete (decision 212, yes branch), then indoor positioning system training program 200 determines whether training is complete at all training points 150, 160, and 170 (decision 214). If indoor positioning system training program 200 determines the data capture is not complete (decision 212, no branch), then indoor positioning system training program 200 continues to receive and transmit data associated with training of training points 150, 160, and/or 170 (step 210).

In decision 214, indoor positioning system training program 200 determines whether training is complete at all training points 150, 160, and 170. In one embodiment, as training occurs, indoor positioning system training program 200 checks the training status associated with training points 150, 160, and 170. For example, indoor positioning system training program 200 includes a list of training point 150, 160, and 170 that belong to the indoor positioning system that includes a training status. Initially indoor positioning system training program 200 assigns a training status of incomplete to training point 150, 160, and 170 (e.g., training is not complete). Indoor positioning system training program 200 updates the training status of training point 150, 160, and/or 170 to in-process once indoor positioning system training program 200 receives and transmits training data associated with training point 150, 160, and/or 170 (step 210). Indoor positioning system training program 200 updates the training status of training point 150, 160, and/or 170 to complete once indoor positioning system training program 200 determines the data capture is complete at training point 150, 160, and/or 170 (decision 212, yes branch). Based on the training status within the list, indoor positioning system training program 200 identifies training point 150, 160, and/or 170 associated with an incomplete training status, and therefore determines training is not complete. In another embodiment, indoor positioning system training program 200 receives a training status update from indoor positioning system training client programs 112 and/or 142 (e.g., indicates current training point status, and whether an additional training point remains within the training queue). In an alternate embodiment, autonomous device 110 and autonomous device 140 communicate via indoor positioning system training client program 112 and indoor positioning system training client program 142 respectively and determine whether training is complete.

If indoor positioning system training program 200 determines training is complete at all training points 150, 160, and 170 (decision 214, yes branch), then indoor positioning system training program 200 completes. If indoor positioning system training program 200 determines training is not complete at all training points 150, 160, and 170 (decision 214, no branch), then indoor positioning system training program 200 navigates autonomous device 110 and/or 140 to training point 150, 160, and/or 170 (step 208).

Figure 3:
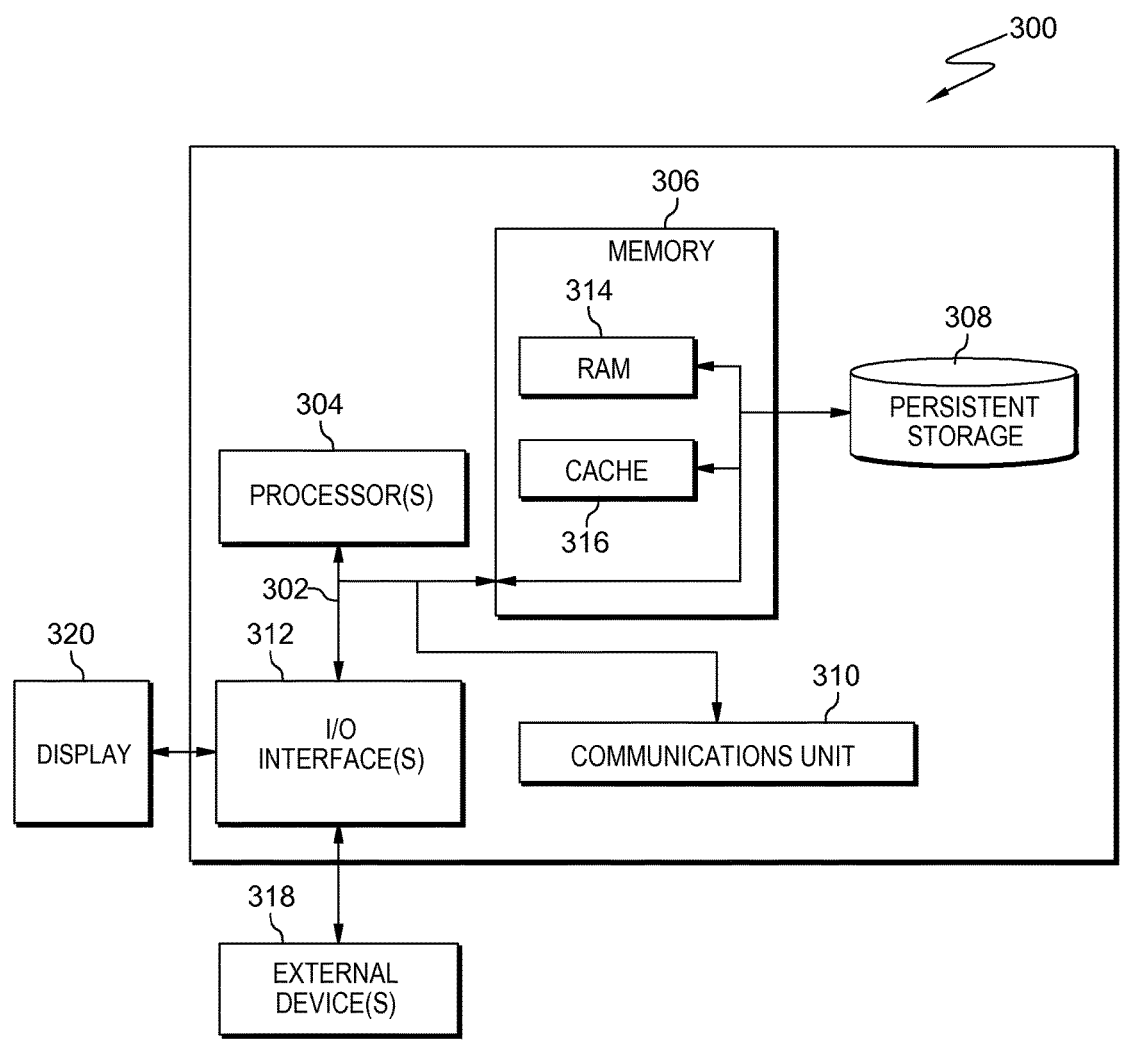
FIG. 3 is a block diagram of components of the server computer executing the indoor positioning system training program, in accordance with an embodiment of the present invention.

FIG. 3 depicts a block diagram of components of server computer 300 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Server computer 300 includes communications fabric 302, which provides communications between cache 316, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory (RAM) 314. In general, memory 306 can include any suitable volatile or non-volatile computer readable storage media. Cache 316 is a fast memory that enhances the performance of computer processor(s) 304 by holding recently accessed data, and data near accessed data, from memory 306.

Indoor positioning system training client programs 112 and 142, virtual map 122, and indoor positioning system training program 200, may be stored in persistent storage 308 and in memory 306 for execution and/or access by one or more of the respective computer processor(s) 304 via cache 316. In an embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Indoor positioning system training client programs 112 and 142, virtual map 122, and indoor positioning system training program 200 may be downloaded to persistent storage 308 through communications unit 310.

I/O interface(s) 312 allows for input and output of data with other devices that may be connected to server computer 300. For example, I/O interface(s) 312 may provide a connection to external device(s) 318, such as a keyboard, a keypad, a touch screen, and/or some other suitable input device. External devices 318 can also include portable computer readable storage media such as, for example, thumb drives, portable optical or magnetic disks, and memory cards. Software and data used to practice embodiments of the present invention, e.g., indoor positioning system training client programs 112 and 142, virtual map 122, and indoor positioning system training program 200, can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for collecting data through a flight plan that controls an unmanned aerial vehicle, the method comprising:

identifying, by one or more computer processors, a virtual map of an indoor environment wherein the virtual map is a vector diagram mapping one or more physical features of the indoor environment that includes: measurements for size, location, a magnitude, and a direction to the one or more physical features within the indoor environment;

determining, by one or more computer processors, a location associated with one or more autonomous devices within the identified virtual map;

providing, by one or more computer processors, to a first autonomous device of the one or more autonomous devices, navigation instructions from the determined location associated with the one or more autonomous devices to a first training point, wherein the first training point is a wireless access point within the indoor environment, wherein the navigation instructions include a flight plan determined by information from an indoor positioning system, wherein the first autonomous device is an unmanned aerial vehicle;

collecting, by one or more computer processors, training data associated with the first training point through the first autonomous device, wherein the training data aids in the calibration of the indoor positioning system;

determining, by one or more computer processors, the first autonomous device reaches the first training point;

responsive to determining the first autonomous device reaches the first training point, receiving, by one or more computer processors, a specified height;

positioning, by one or more computer processors, the first autonomous device based on one of the following: altering a hover height to the received specified height and raising an antenna to the received specified height;

receiving, by one or more computer processors, an indication that the positioned first autonomous device is in position for training the first training point;

sending, by one or more computer processors, an indication to initiate training of the first training point;
analyzing, by one or more computer processors, the collected training data; and
calibrating, by one or more computer processors, the first training point based on the analyzed training data.

2. The method of claim 1, wherein determining the location associated with the one or more autonomous devices within the received virtual map further comprises:
receiving, by one or more computer processors, data from a first scan of the environment, wherein the received data includes reflections that indicate objects within the scan of the environment;
calculating, by one or more computer processors, a first set of one or more distances and directions of the first autonomous device relative to the objects within the first scan of the environment based on the received reflections; and
comparing, by one or more computer processors, the first set of calculated one or more distances and directions of the first autonomous device relative to objects with one or more distances and directions of the first autonomous device relative to objects associated with the determined location of the first autonomous device within the identified virtual map.

3. The method of claim 1, further comprising:
determining, by one or more computer processors, whether an ambiguity exists in the determined location of the first autonomous device of the one or more autonomous devices within the identified virtual map, wherein the ambiguity identifies at least two determined locations of the first autonomous device;
responsive to determining the ambiguity exists, repositioning, by one or more computer processors, the first autonomous device;
performing, by one or more computer processors, a second scan of the indoor environment;
receiving, by one or more computer processors, data from the second scan of the indoor environment;
calculating, by one or more computer processors, a second set of one or more distances and directions of the first autonomous device based on the received data from the second scan of the indoor environment;
comparing, by one or more computer processors, the second set of calculated one or more distances and directions of the first autonomous device to the at least two determined locations of the first autonomous device associated with the determined ambiguity; and
determining, by one or more computer processors, a location associated with the repositioned first autonomous device within the identified virtual map based on the comparison.

4. The method of claim 1, further comprising:
sending, by one or more computer processors, a received signal strength indicator at a specified level to the first training point from the first autonomous device, wherein the sent received signal strength indicator is a set uniform power level;
collecting, by, one or more computer processors, training data associated with the first training point via the first autonomous device based on the sent received signal strength indicator, wherein the training data includes a measured received signal strength indicator level associated with the first training point; and
determining, by one or more computer processors, whether the collected training data exceeds a defined data threshold that includes one of: a specific number of data points based on the collected training data, a maximum variation between the sent received signal strength indicator and the received signal strength indicator level associated with the first training point and a minimum variation, and a minimum variation between the sent received signal strength indicator and the received signal strength indicator level associated with the first training point.

5. The method of claim 4, further comprising:
responsive to determining the collected training data exceeds the defined data threshold, identifying, by one or more computer processors, a second training point in which collection of training data has yet to occur.

6. The method of claim 1, wherein the one or more autonomous devices communicate information between the one or more autonomous devices, and wherein the communicated information includes a location associated with each of the one or more autonomous devices, an operational status associated with each of the one or more autonomous devices that identifies one of the following: an on state, an off state, and a training state, an assigned training point that identifies the wireless access point to be trained by each of the one or more autonomous devices, and training information.

7. A computer program product for collecting data through a flight plan that controls an unmanned aerial vehicle, the computer program product comprising:
one or more computer readable storage media and program instructions stored on the one or more computer readable storage media, the program instructions comprising:
program instructions to identify a virtual map of an indoor environment wherein the virtual map is a vector diagram mapping one or more physical features of the indoor environment that includes: measurements for size, location, a magnitude and a direction to the one or more physical features within the indoor environment;
program instructions to determine a location associated with one or more autonomous devices within the identified virtual map;
program instructions to provide to a first autonomous device of the one or more autonomous devices, navigation instructions from the determined location associated with the one or more autonomous devices to a first training point, wherein the first training point is a wireless access point within the indoor environment, wherein the navigation instructions include a flight plan determined by information from an indoor positioning system, wherein the first autonomous device is an unmanned aerial vehicle;
program instructions to collect training data associated with the first training point through the first autonomous device, wherein the training data aids in the calibration of the indoor positioning system;
program instructions to determine the first autonomous device reaches the first training point;
responsive to determining the first autonomous device reaches the first training point, program instructions to receive a specified height;
program instructions to position the first autonomous device based on one of the following: altering a hover height to the received specified height and raising an antenna to the received specified height;
program instructions to receive an indication that the positioned first autonomous device is in position for training the first training point;

program instructions to send an indication to initiate training of the first training point;
program instructions to analyze the collected training data; and
program instructions to calibrate the first training point based on the analyzed training data.

8. The computer program product of claim 7, wherein to determine the location associated with the one or more autonomous devices within the received virtual map further comprises program instructions, stored on the one or more computer readable storage media, to:
receive data from a first scan of the environment, wherein the received data includes reflections that indicate objects within the scan of the environment;
calculate a first set of one or more distances and directions of the first autonomous device relative to the objects within the first scan of the environment based on the received reflections; and
compare the first set of calculated one or more distances and directions of the first autonomous device relative to objects with one or more distances and directions of the first autonomous device relative to objects associated with the determined location of the first autonomous device within the identified virtual map.

9. The computer program product of claim 7, further comprising program instructions, stored on the one or more computer readable storage media, to:
determine whether an ambiguity exists in the determined location of the first autonomous device of the one or more autonomous devices within the identified virtual map, wherein the ambiguity identifies at least two determined locations of the first autonomous device;
responsive to determining the ambiguity exists, reposition the first autonomous device;
perform a second scan of the indoor environment;
receive data from the second scan of the indoor environment;
calculate a second set of one or more distances and directions of the first autonomous device based on the received data from the second scan of the indoor environment;
compare the second set of calculated one or more distances and directions of the first autonomous device to the at least two determined locations of the first autonomous device associated with the determined ambiguity; and
determine a location associated with the repositioned first autonomous device within the identified virtual map based on the comparison.

10. The computer program product of claim 7, further comprising program instructions, stored on the one or more computer readable storage media, to:
send a received signal strength indicator at a specified level to the first training point from the first autonomous device, wherein the sent received signal strength indicator is a set uniform power level;
collect training data associated with the first training point via the first autonomous device based on the sent received signal strength indicator, wherein the training data includes a measured received signal strength indicator level associated with the first training point; and
determine whether the collected training data exceeds a defined data threshold that includes one of: a specific number of data points based on the collected training data, a maximum variation between the sent received signal strength indicator and the received signal strength indicator level associated with the first training point and a minimum variation, and a minimum variation between the sent received signal strength indicator and the received signal strength indicator level associated with the first training point.

11. The computer program product of claim 10, further comprising program instructions, stored on the one or more computer readable storage media, to:
responsive to determining the collected training data exceeds the defined data threshold, identify a second training point in which collection of training data has yet to occur.

12. The computer program product of claim 7, wherein the one or more autonomous devices communicate information between the one or more autonomous devices, and wherein the communicated information includes a location associated with each of the one or more autonomous devices, an operational status associated with each of the one or more autonomous devices that identifies one of the following: an on state, an off state, and a training state, an assigned training point that identifies the wireless access point to be trained by each of the one or more autonomous devices, and training information.

13. A computer system for collecting data through a flight plan that controls an unmanned aerial vehicle, the computer system comprising:
one or more computer processors, one or more computer readable storage media, and program instructions stored on the computer readable storage media for execution by at least one of the one or more processors, the program instructions comprising:
program instructions to identify a virtual map of an indoor environment wherein the virtual map is a vector diagram mapping one or more physical features of the indoor environment that includes: measurements for size, location, and a magnitude and a direction to the one or more physical features within the indoor environment;
program instructions to determine a location associated with one or more autonomous devices within the identified virtual map;
program instructions to provide to a first autonomous device of the one or more autonomous devices, navigation instructions from the determined location associated with the one or more autonomous devices to a first training point, wherein the first training point is a wireless access point within the indoor environment, wherein the navigation instructions include a flight plan determined by information from an indoor positioning system, wherein the first autonomous device is an unmanned aerial vehicle;
program instructions to collect training data associated with the first training point through the first autonomous device, wherein the training data aids in the calibration of the indoor positioning system;
program instructions to determine the first autonomous device reaches the first training point;
responsive to determining the first autonomous device reaches the first training point, program instructions to receive a specified height;
program instructions to position the first autonomous device based on one of the following: altering a hover height to the received specified height and raising an antenna to the received specified height;
program instructions to receive an indication that the positioned first autonomous device is in position for training the first training point;

program instructions to send an indication to initiate training of the first training point;
program instructions to analyze the collected training data; and
program instructions to calibrate the first training point based on the analyzed training data.

14. The computer system of claim 13, wherein to determine the location associated with the one or more autonomous devices within the received virtual map further comprises program instructions, stored on the one or more computer readable storage media, to:
receive data from a first scan of the environment, wherein the received data includes reflections that indicate objects within the scan of the environment;
calculate a first set of one or more distances and directions of the first autonomous device relative to the objects within the first scan of the environment based on the received reflections; and
compare the first set of calculated one or more distances and directions of the first autonomous device relative to objects with one or more distances and directions of the first autonomous device relative to objects associated with the determined location of the first autonomous device within the identified virtual map.

15. The computer system product of claim 13, further comprising program instructions, stored on the one or more computer readable storage media, to:
determine whether an ambiguity exists in the determined location of the first autonomous device of the one or more autonomous devices within the identified virtual map, wherein the ambiguity identifies at least two determined locations of the first autonomous device;
responsive to determining the ambiguity exists, reposition the first autonomous device;
perform a second scan of the indoor environment;
receive data from the second scan of the indoor environment;
calculate a second set of one or more distances and directions of the first autonomous device based on the received data from the second scan of the indoor environment;
compare the second set of calculated one or more distances and directions of the first autonomous device to the at least two determined locations of the first autonomous device associated with the determined ambiguity; and
determine a location associated with the repositioned first autonomous device within the identified virtual map based on the comparison.

16. The computer system of claim 13, further comprising program instructions, stored on the one or more computer readable storage media, to:
send a received signal strength indicator at a specified level to the first training point from the first autonomous device, wherein the sent received signal strength indicator is a set uniform power level;
collect training data associated with the first training point via the first autonomous device based on the sent received signal strength indicator, wherein the training data includes a measured received signal strength indicator level associated with the first training point; and
determine whether the collected training data exceeds a defined data threshold that includes one of: a specific number of data points based on the collected training data, a maximum variation between the sent received signal strength indicator and the received signal strength indicator level associated with the first training point and a minimum variation, and a minimum variation between the sent received signal strength indicator and the received signal strength indicator level associated with the first training point.

* * * * *